United States Patent
Yoshida et al.

[11] Patent Number: 5,875,366
[45] Date of Patent: Feb. 23, 1999

[54] SPROCKET WHEEL AND PHOTO FILM ADVANCING DEVICE

[75] Inventors: Toshio Yoshida; Kazuhiko Onda, both of Saitama; Hirofumi Katsura, Kanagawa, all of Japan

[73] Assignees: Fuji Photo Film Co., Ltd., Kanagawa; Fuji Photo Optical Co., Ltd., Saitama, both of Japan

[21] Appl. No.: 941,317

[22] Filed: Sep. 30, 1997

Related U.S. Application Data

[63] Continuation of Ser. No. 604,236, Feb. 21, 1996, abandoned.

[30]   Foreign Application Priority Data

Feb. 21, 1995  [JP]  Japan ................................. 7-032413
  Oct. 6, 1995   [JP]  Japan ................................. 7-260194

[51] Int. Cl.⁶ .............................. G03B 1/00; G03B 17/42
[52] U.S. Cl. ......................... 396/395; 396/397; 396/401; 396/411
[58] Field of Search ..................... 396/395, 397, 396/401, 411, 387, 440; 352/166; 226/76, 78

[56]     References Cited

U.S. PATENT DOCUMENTS

| | | | |
|---|---|---|---|
| 3,237,542 | 3/1966 | Ataka | 396/412 |
| 3,380,361 | 4/1968 | Winkler | 396/440 |
| 3,682,066 | 8/1972 | Simon | 396/394 |
| 4,034,388 | 7/1977 | Iwashita et al. | 396/418 |
| 4,530,582 | 7/1985 | Hara et al. | 396/440 |
| 5,333,020 | 7/1994 | Tsukada et al. | 352/166 |
| 5,410,380 | 4/1995 | Kawamura et al. | 396/395 |
| 5,471,265 | 11/1995 | Shibata et al. | 396/60 |
| 5,510,866 | 4/1996 | Solomon et al. | 396/395 |
| 5,521,669 | 5/1996 | Kamata | 396/401 |
| 5,539,484 | 7/1996 | Wakabayashi | 396/404 |
| 5,548,364 | 8/1996 | Muramatsu et al. | 396/6 |
| 5,585,877 | 12/1996 | Huang et al. | 396/399 |
| 5,634,161 | 5/1997 | Huang et al. | 396/398 |

FOREIGN PATENT DOCUMENTS 6-82955  3/1994  Japan .

Primary Examiner—Eddie C. Lee
Attorney, Agent, or Firm—Young & Thompson

[57]         ABSTRACT

Photo film (15) has pairs of perforations (21) arranged at a regular pitch (L1+L2). A photo film advancing device for advancing the photo film by the regular pitch (L1+L2) has a take-up spool (23), which winds the photo film after each exposure. A rotatable sprocket wheel (26, 68, 80, 83, 90) has a circular peripheral face (27, 71, 80c, 87, 93) with first and second teeth. The first (25a, 68a, 80a, 85b, 91a) and second teeth (25b, 68b, 80b, 85a, 91b) engage the respective perforations. A wind stop claw (36a) locks the sprocket wheel to prevent the photo film from advancing when the first and/or second perforation is engaged with the first and/or second tooth. The wind stop claw unlocks the sprocket wheel when a shutter (44) operates. While unlocked, the sprocket wheel is rotated a small amount by advancement of the photo film, to move the second tooth away from the second perforation. The peripheral face of the sprocket wheel frictionally contacts the photo film. Then the first tooth contacts the photo film to stand by to engage the succeeding first perforation. While the first tooth stands by, the photo film is advanced in contact with the first tooth.

24 Claims, 14 Drawing Sheets

F I G. 2
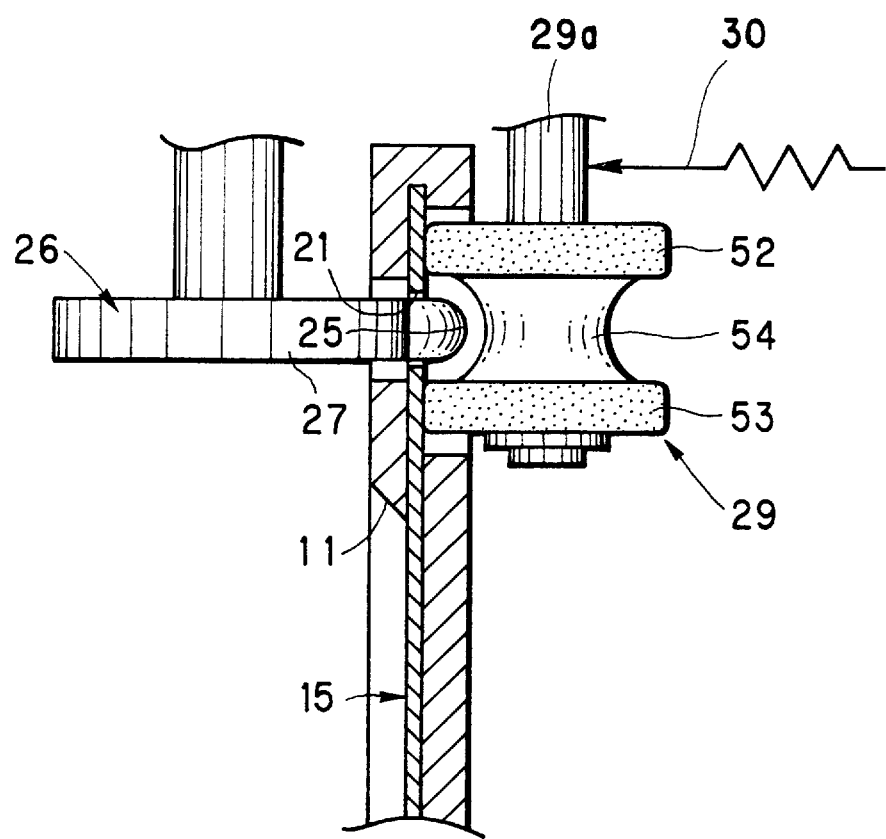

F I G. 16
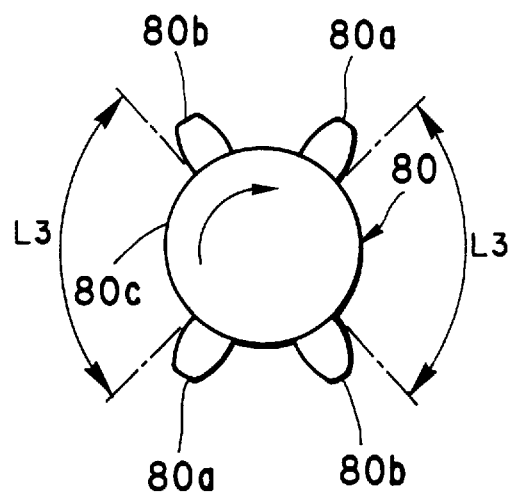

F I G. 17
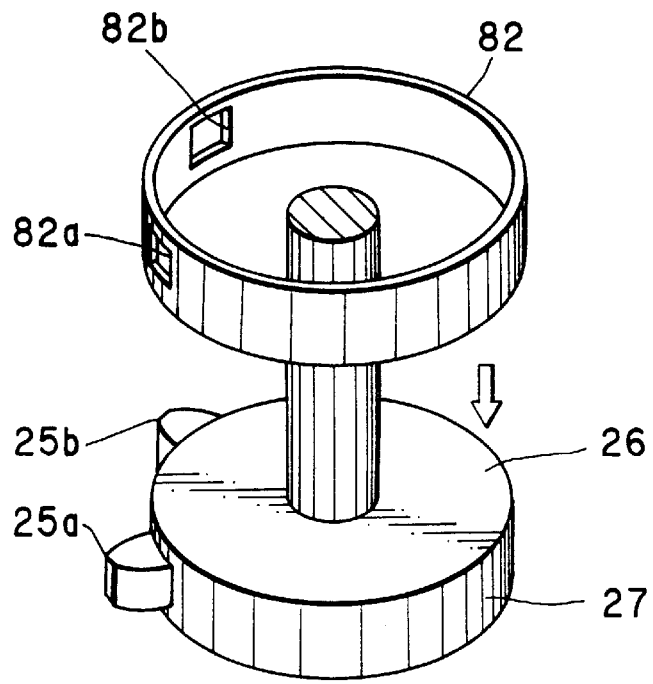
F I G. 18
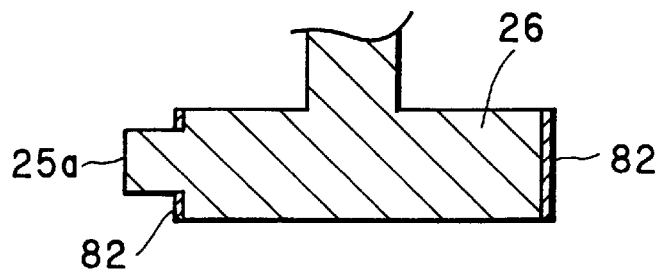

SPROCKET WHEEL AND PHOTO FILM ADVANCING DEVICE

This application is a continuation of application Ser. No. 08/604,236, filed Feb. 21, 1996, now abandoned.

BACKGROUND OF THE INVENTION

1. Field of the Invention

The present invention relates to a sprocket wheel and a photo film advancing device. More particularly, the present invention relates to a sprocket wheel for use with a photo film in which each of frames is associated with two perforations regularly, and a photo film advancing device for advancing the photo film.

2. Description Related to the Prior Art

A lens-fitted photo film unit, as known in the art, is pre-loaded with unexposed photo film and incorporates a photo film advancing device. The photo film advancing device has a construction in which a sprocket wheel is rotated by movement of photo film, and adapted to charging a shutter. Such a photo film advancing device is also utilized in a simplified camera of a low-cost type. In view of the photo film of a 135 type having eight perforations per frame, the sprocket wheel in the photo film advancing device has eight teeth. Upon advancement of the photo film as much as eight perforations, the sprocket wheel makes one rotation. Thereupon, a manually operable winding wheel is stopped from rotating, to stop the photo film. In the course of the one frame feeding, the shutter is charged. In the photo film advancing device, the advancement of the photo film is mechanically detected by use of the perforations. Only a simple structure can detect the one frame feeding exactly. At least one of the teeth of the sprocket wheel is engaged with a train of the perforations, so that the photo film advancing device can receive relatively high drive force from the photo film. It is possible with reliability to charge the shutter while displacing a spring.

U.S. Pat. No. 5,471,265 (corresponding to JP-A (Japanese Patent Laid-open Publication No.) 5-19368) discloses a photo film in which each frame is associated with two perforations. One of the two is associated with an edge of the frame nearer to the leader. The other of the two is associated with an edge of the frame nearer to the trailer. Each frame is created between positions of the two perforations. The perforations are arranged at two intervals which are alternately repeated. The longer of the two intervals is related to a length of each frame. The shorter of the two intervals is related to an interval between two adjacent frames.

To detect the one frame feeding of the photo film of this type, it is conceivable to monitor passage of the perforations through a photo sensor to stop of the photo film. One of every two of the perforations may be detected photoelectrically. Optionally each pair of perforations may be detected photoelectrically. However, such techniques are unsuitable for a compact camera of a low-cost type, because complicated circuits for amplifying and rectifying a photoelectric signal from the photo sensor would be required as well as the photo sensor.

It is also conceivable to use a detector claw used in a 110 camera of a simple type. The detector claw may be biased by a spring, and mechanically shifted to move into each perforation. When the detector claw enters a perforation at an edge of each frame nearer to the trailer, one frame feeding of the photo film can be detected. This can be detected also upon movement as far as a regular length after entry of the detector claw into a perforation. However, a shortcoming lies in that a mechanism is inevitably required for removing the detector claw from the perforations. Such a removing mechanism, with its excessively complicated linkages, is likely to operate erroneously. Another disadvantage lies in efficient use of interior space, because the claw must be moved perpendicularly to the movement of the photo film.

SUMMARY OF THE INVENTION

In view of the foregoing problems, an object of the present invention is to provide a photo film advancing device with a simple structure which can effect the one-frame feeding of photo film in which each frame is associated with two regularly spaced perforations.

In order to achieve the above and other objects and advantages of this invention, a photo film to be advanced has pairs of perforations arranged at a regular pitch along one edge thereof. Each pair of the perforations includes a first and a second perforation arranged at a small regular interval away from one another. The photo film advancing device comprises a photo film winding mechanism for winding the photo film in an advancing direction after each of the frames is exposed. A rotatable sprocket wheel has a circular peripheral face of which an arc length is shorter than the regular pitch. At least one pair of teeth is disposed on the peripheral face of the sprocket wheel. Each pair of the at least one pair of teeth includes first and second teeth disposed away from one another in association with the regular interval of the perforations. The first tooth is engaged with the first perforation. The second tooth is engaged with the second perforation. A wind stop mechanism locks the sprocket wheel when the first perforation is engaged with the first tooth and/or when the second perforation is engaged with the second tooth. The wind stop mechanism the sprocket wheel when a shutter operates. Upon being set in the unlocked state, the sprocket wheel is rotated a small amount by advancement of the photo film, to move the second tooth away from the second perforation. The peripheral face of the sprocket wheel frictionally contacts the photo film. The sprocket wheel is rotated further by a predetermined amount while in contact with the photo film. Then the first tooth is contacted on the photo film to stand by for engagement with the first perforation of a succeeding pair of perforations. While the first tooth stands by, the photo film is advanced in contact with the first tooth.

In a preferred embodiment, a pressing mechanism is disposed opposite to the sprocket wheel with reference to the photo film, for pressing the photo film against the peripheral face of the sprocket wheel while rendering the sprocket wheel rotatable.

In another embodiment, at least the peripheral face of the sprocket wheel is formed of material having high coefficient of friction.

In yet another embodiment, a cutout is formed in the second tooth, for rendering the second tooth deformable with resiliency toward an inside of the sprocket wheel. A gear box contains the sprocket wheel in rotatable fashion, the photo film being contacted on the gear box. A projection is projected from an inside of the gear box, confronted with the second tooth when the sprocket wheel is rotated by the predetermined amount, pressed by the second tooth in a rotational orbit thereof while the first tooth stands by for the first perforation of the succeeding pair of perforations, for bringing the first tooth in contact with the photo film.

By way of the photo film winding mechanism, a take-up spool takes up a leader of the photo film to wind the photo film. A motor rotates the take-up spool. A control circuit drives the motor immediately after the shutter is driven, and for stopping the motor when the wind stop mechanism sets the sprocket wheel in the locked state.

Still another preferred sprocket wheel for use with the photo film has a circular peripheral face, of which an arc length is shorter than N times as much as the regular pitch, where N is one or more. N pairs of teeth are disposed on the peripheral face of the sprocket wheel and regularly at 1/N rotation away from one another, each pair of the pairs of teeth including first and second teeth disposed away from one another in association with the regular interval, the first tooth being engaged with the first perforation, and the second tooth being engaged with the second perforation.

BRIEF DESCRIPTION OF THE DRAWINGS

The above objects and advantages of the present invention will become more apparent from the following detailed description when read in connection with the accompanying drawings, in which:

FIG. 2 is an explanatory view in elevation, illustrating a roller set and relevant portions;

FIG. 16 is a plan view illustrating another preferred sprocket wheel making half a rotation while the photo film is advanced as much as one frame;

FIG. 17 is an exploded perspective view illustrating an additional preferred sprocket wheel with a thin rubber ring fitted thereabout;

FIG. 18 is a section illustrating the sprocket wheel;

DETAILED DESCRIPTION OF THE PREFERRED EMBODIMENT(S) OF THE PRESENT INVENTION

Figure 1:
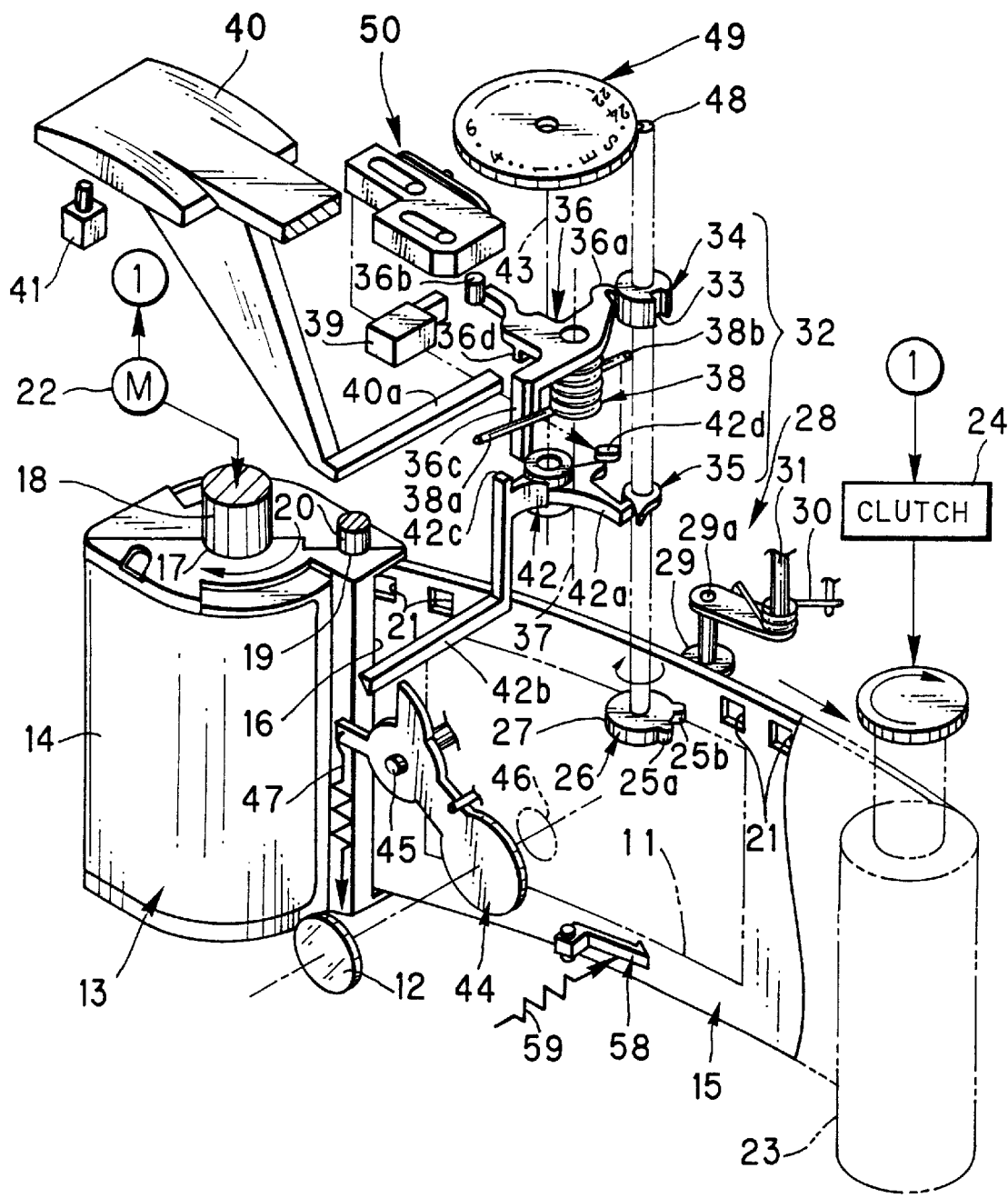
FIG. 1 is a perspective view illustrating a photo film advancing device.

In FIG. 1, a camera has an exposure aperture 11, which is located between a cassette containing chamber in the left and a photo film take-up chamber in the right as viewed in the drawing. A rear face of the exposure aperture 11 has an arcuate curvature centered at a taking lens 12. A rear wall of the camera is confronted with the exposure aperture 11, and has a similar curvature.

The cassette containing chamber is loaded with a photo film cassette 13, which has a cassette shell 14 and a spool rotatable therein. A strip of photo film 15 is wound about the spool. When the spool is rotated in an unwinding direction, the photo film 15 is directed to the outside of the cassette shell 14 through a photo film port 16.

All the photo film 15 is wound about the spool, and the film's trailer is secured with the emulsion surface of the photo film 15 directed toward the spool. Distal ends of the spool are provided with respective grooved keys, which emerge externally through end faces of the cassette shell 14. One grooved key 17 is engaged with a drive shaft 18 disposed in the cassette containing chamber of the camera. Rotation of the drive shaft 18 rotates the spool.

A port shutter member disposed in the photo film port 16 shields light from the inside of the cassette shell. The port shutter is rotatable between an open position and a closed position of the photo film port 16. Distal ends of the port shutter are provided with respective grooved keys, which emerge externally through end faces of the cassette shell 14. One grooved key 19 is engaged with a drive shaft 20 disposed in the cassette containing chamber of the camera. Operation of the drive shaft 20 is responsive to the opening/closing operation of a bottom lid for closing the cassette containing chamber of the camera. When the bottom lid is opened, the drive shaft 20 rotates the port shutter to the closed position. When the bottom lid is closed, the drive shaft 20 rotates the port shutter to the open position.

The drive shafts 18 and 20 are located at the top of the cassette containing chamber and directed in a direction of inserting the photo film cassette 13. When a bottom lid is opened and the photo film cassette 13 is inserted, the grooved keys 17 and 19 are smoothly engaged respectively with the drive shafts 18 and 20.

Figure 3:
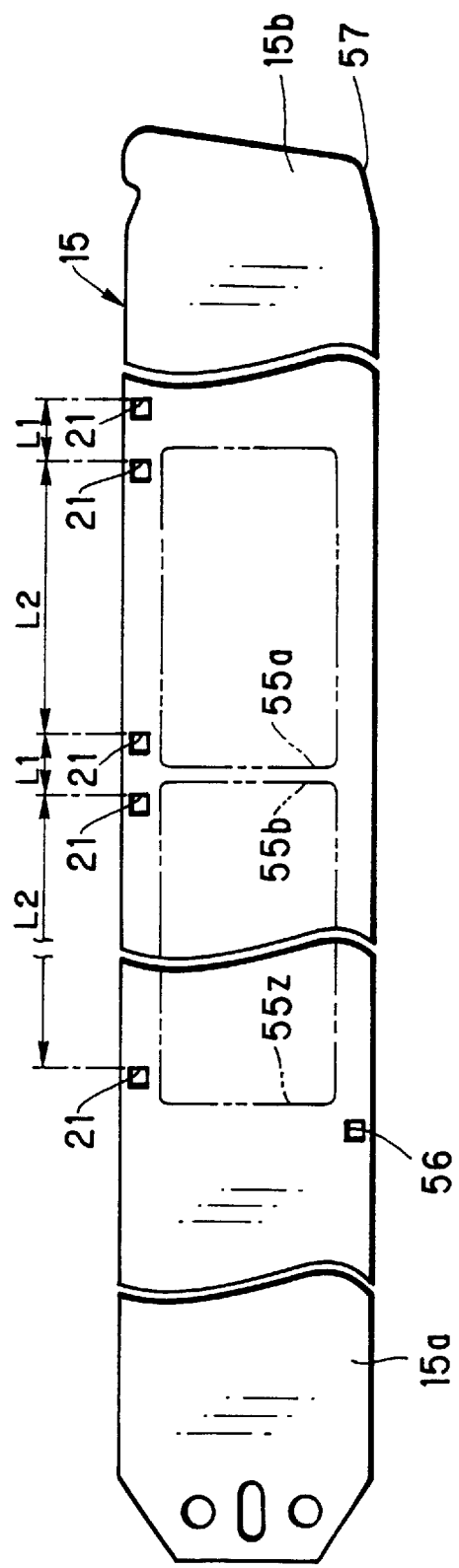
FIG. 3 is a plan view illustrating a photo film.

There are perforations 21 formed in the photo film 15 and arranged along one of its edges. As illustrated in FIG. 3, the perforations 21 are arranged in pairs. The pairs are formed in the photo film 15 and arranged at a regular pitch L1+L2 along at least one edge thereof, where the regular pitch L1+L2 is adapted to advancing the photo film 15 and forming exposure frames on the photo film 15. Each of the pairs of the perforations 21 includes a first and second perforation arranged at a small regular interval L1 from one another. To be precise, the camera operates to advance the photo film 15 so that a center of a greater regular interval L2 between the pairs of the perforations 21 is positioned at the center of the exposure aperture 11 in the camera.

When the bottom lid is closed, the port shutter is rotated to an open position. When the shutter button is depressed, a motor 22 begins rotating in a forward direction. It is noted that the motor 22 may begin rotation upon a lid closing signal generated in closing of the bottom lid, or upon a rotation finish signal generated upon completion of rotating the drive shaft 20 to open the port shutter. The rotation of the motor 22 is transmitted to the drive shaft 18. The spool of the photo film cassette 13 is rotated in the unwinding direction. A leader of the photo film 15 is advanced through the photo film port 16, passed through a narrow passageway behind the exposure aperture 11, and directed to the take-up chamber.

In the take-up chamber, a take-up spool 23 is disposed in rotatable fashion. Rotation of the motor 22 is transmitted by a reduction gear train to the take-up spool 23. The take-up spool 23 takes up the leader of the photo film 15 and winds it thereabout. There is a slip mechanism incorporated between the motor 22 and the drive shaft 18. The slip mechanism absorbs a difference in rotation between the motor 22 and the take-up spool 23 on which a roll diameter increases in the course of winding of the photo film 15.

When all exposures are taken on the photo film 15, the photo film 15 is wound back. For this operation, the motor 22 is driven to rotate in a backward direction. There is a clutch 24 associated between the motor 22 and the take-up spool 23. The clutch 24 disconnects the motor 22 from the take-up spool 23, which is not driven. The photo film 15 is contained into the cassette shell 14 only by the rotation of the spool in the rewinding direction.

A sprocket wheel 26 is disposed over the exposure aperture 11 in rotatable fashion, and has two teeth 25 to be engaged with the first and second perforations, which are arranged at the small regular interval L1 away from one another in each of the pairs of the perforations 21.

There is disposed a pressing mechanism 28 behind the photo film 15 to confront with the sprocket wheel 26. The pressing mechanism 28 is constituted by a roller set 29 and a spring 30. The roller set 29 is swingable about a shaft 31 and between a position of contact with the photo film 15 and a position backwards away from the photo film 15. The roller set 29 is biased by the spring 30 in a direction of pressing the photo film 15 against the sprocket wheel 26.

For the one frame feeding of the photo film 15, the sprocket wheel 26 is rotated by the advancement of the photo film 15. A first tooth 25a of the two teeth 25 is moved away from an associated one of the perforations 21. The one frame feeding of the photo film 15 is finished while a second tooth 25b of the two teeth 25 is engaged with an associated one of the perforations 21. The roller set 29 is pressing the photo film 15 against a circular peripheral face 27 of the sprocket wheel 26. After disengagement of the two teeth 25 from the perforations 21, the friction between the photo film 15 and the peripheral face 27 causes the photo film 15 to rotate the sprocket wheel 26. In the course of the rotation of the sprocket wheel 26, the first tooth 25a comes in contact with the photo film 15, and is hindered thereby from rotating further. However the photo film 15 is still advanced while contacting the peripheral face 27.

When the first tooth 25a contacts the photo film, the first tooth 25a is standing by to mesh with a succeeding one of the perforations 21. The photo film 15 is advanced while contacting the peripheral face 27, before the succeeding one of the perforations 21 comes to the first tooth 25a, which is immediately engaged therewith. Further advancement of the photo film 15 engages the second tooth 25b with another one of the perforations 21. The first tooth 25a is now moved away from the associated one of the perforations 21. One rotation of the sprocket wheel 26 is finished. In short, one rotation of the sprocket wheel 26 during one frame advance of the photo film 15 includes the wheel driving step through the engagement of the two teeth 25a and 25b with the perforations 21, the wheel driving step through the frictional contact between the peripheral face 27 and the photo film 15, and the wheel slipping step as the first tooth 25a contacts the photo film 15.

It would be possible to set an arc length of the peripheral face 27 of the sprocket wheel 26 equal to the regular pitch L1+L2 of the one frame feeding of the photo film 15. However a small slip would be likely to occur in the course of the frictional rotation of the sprocket wheel 26 with the advancement of the photo film 15. With such a small slip, the photo film 15 would advance beyond regular rotation of the sprocket wheel 26. The two teeth 25 would fall behind the proper position to mesh with an associated pair of the perforations 21, and would eventually mesh with another pair of the perforations 21 after one frame. The missed frame would be wasted without being exposed. In the present invention, an arc length of the peripheral face 27 is set smaller than a length of one frame, namely the regular pitch L1+L2 of the one frame feeding of the photo film 15. The first tooth 25a is rotatable to move to a position for mesh with an associated one of the perforations 21, and stand by for meshing earlier than the associated one of the perforations 21. To be precise, the perforations 21 are formed with L1=5.8 mm and L2=31.7 mm. It is preferable that the arc length of the peripheral face 27 is 28.9 mm, and an angle between the two teeth 25 is 65 degrees.

The arc length of the peripheral face 27 is set smaller than the length of the one frame feeding of the photo film 15. The first tooth 25a comes to the standby position before the succeeding one of the perforations 21 comes to the position of engagement. A side of the first tooth 25a relative to its thickness direction contacts the photo film 15 in an area in which there are no perforations 21. The photo film 15 slips against peripheral face 27 while advanced. The sprocket wheel 26 is not rotating despite the advancement of the photo film 15. Accordingly the difference between the frame length in the photo film 15 and the arc length of the peripheral face 27 is absorbed. A pair of the perforations 21 come to the position, and mesh with the two teeth 25a and 25b successively, to finish the rotation.

A set cam 32 is disposed in rotatable fashion together with the sprocket wheel 26. The set cam 32 includes a barrel portion 34 with a wind stop cam recess 33, and a charge cam portion 35 on the bottom thereof.

On the barrel portion 34, a wind stop claw 36a of a wind stop claw member 36 is contacted. The wind stop claw member 36 is swingable about a shaft 37, and includes a driving projection 36b, a driven projection 36c and a bottom ridge 36d as well as the wind stop claw 36a. The wind stop claw member 36 is swung between a wind stop position and an disengaged position. In the wind stop position, the wind stop claw 36a is inserted in the wind stop cam recess 33 to stop the sprocket wheel 26 from rotating. In the disengaged position, the wind stop claw 36a is moved out of the wind stop cam recess 33 to unlock the sprocket wheel 26.

A coil spring 38 has a distal end 38a secured to the driven projection 36c of the wind stop claw member 36. The wind stop claw member 36 is biased by the coil spring 38 clockwise toward the wind stop position about the shaft 37.

When the wind stop claw member 36 swings to the disengaged position, the driving projection 36b turns on a switch 39. When the wind stop claw member 36 is in the wind stop position, the driving projection 36b turns off the switch 39. When the wind stop claw member 36 is in the wind stop position, the bottom ridge 36d comes into a rotational orbit of the a top ridge 42c, to retain a charge claw member 42 in a charge position, to be described later in detail. When the wind stop claw member 36 is in the disengaged position, the bottom ridge 36d leaves the rotational orbit of the top ridge 42c, to release the charge claw member 42 from the retention in the charge position. When a shutter release button 40 is depressed, the driven projection 36c is pushed by a rod 40a on the bottom of the shutter release button 40, to swing the wind stop claw member 36 to the disengaged position. The shutter release button 40 is formed by forming a three-sided slit in a top wall of a plastic body of the camera. The shutter release button 40 is sufficiently resilient as to recover its initial form upon being released from force of the depression. There is disposed a switch 41 under the shutter release button 40 for detecting depression of the shutter release button 40.

The purpose of the switch 39 is to detect the release of the film from retention. Switch 41 prevents photo film from being wound during the shutter release. After the opening/closing operation of the shutter, the wind stop claw member 36 is swung to the disengaged position, to turn on the switch 39. When the shutter released button 40 is released it turns off the switch 41. Then the motor 22 is rotated forwards, to advance the photo film. When the switch 39 is turned off, the motor 22 stops rotating.

The charge cam portion 35 is contacted on a charge claw 42a of the charge claw member 42. The charge claw member 42 is supported in swingable fashion about a shaft 43, and includes a striking arm 42b, the top ridge 42c, and a receiving portion 42d as well as the charge claw 42a. The charge claw member 42 is swung between a charge position and an initial position. In the charge position, the charge claw 42a is shifted clockwise by the charge cam portion 35. In the initial position, the charge claw 42a is shifted counterclockwise toward the charge cam portion 35.

Another distal end 38b of the coil spring 38 is secured to the receiving portion 42d of the charge claw member 42. The charge claw member 42 is biased by the coil spring 38 counterclockwise toward the initial position about the shaft 43.

The striking arm 42b strikes a driven arm of a shutter blade 44 while the charge claw member 42 is swung from the charge position to the initial position. The shutter blade 44 is swung about a shaft 45 clockwise, to open a shutter opening 46. Then the shutter blade 44 is returned by a return spring 47 to its initial position to close the shutter opening 46. When the charge claw member 42 has the initial position again, the top ridge 42c comes into a rotational orbit of the bottom ridge 36d of the wind stop claw member 36, to retain the wind stop claw member 36 in the disengaged position.

When the sprocket wheel 26 makes one rotation in the advancement of the photo film 15, the charge cam portion 35 rotates the charge claw member 42 from the initial position to the charge position. The charge cam portion 35 has such a shape that the charge claw member 42 is rotated to the charge position while the two teeth 25 mesh with the perforations 21. This is because, if the charge claw member 42 in a different structure were rotated to the charge position in while the two teeth 25 were disengaged from the perforations 21, the photo film 15 would be slipped by the bias of the coil spring 38 overcoming the friction between the shaft 37 and the photo film 15.

A one-toothed gear 48 is formed on the top of the set cam 32. When the sprocket wheel 26 makes the one rotation, the one-toothed gear 48 steps a frame counter wheel 49. A top face of the frame counter wheel 49 is provided with serially arranged numbers as a scale. Each time the frame counter wheel 49 is stepped, the number of exposed frames is indicated through a window in increasing order.

Figure 9:
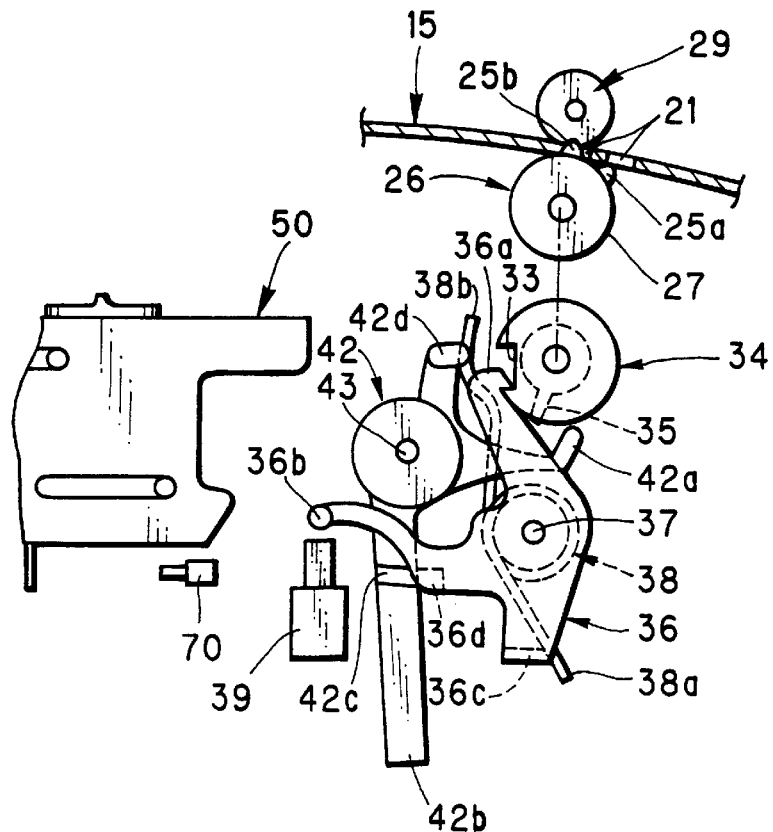
FIG. 9 is an explanatory view illustrating a state of the photo film advancing device immediately after the shutter charging.
Figure 13:
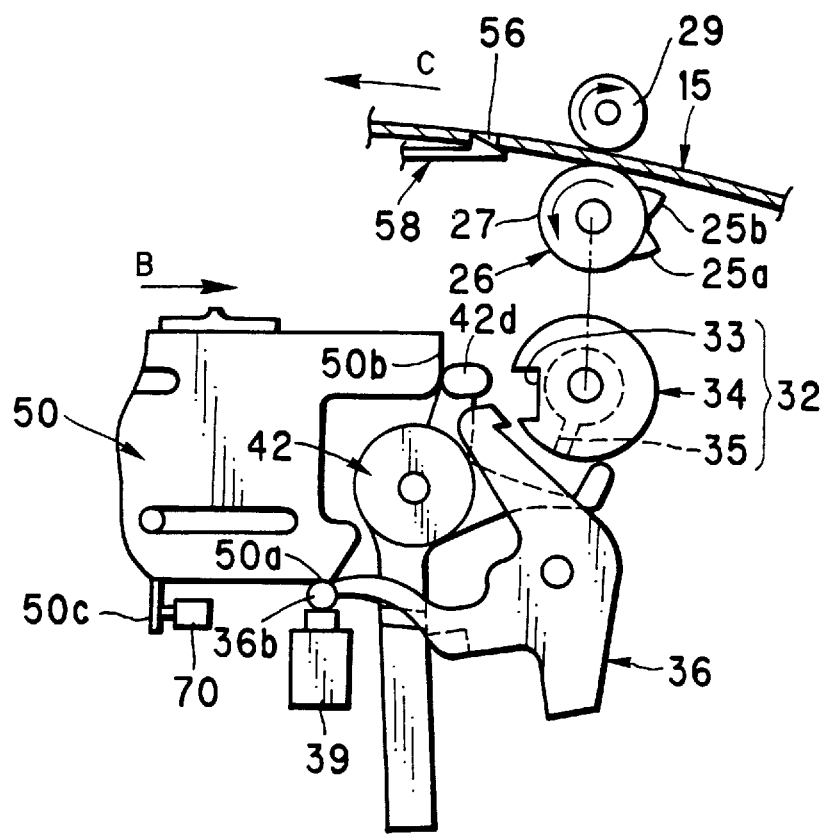
FIG. 13 is an explanatory view illustrating a state of the photo film advancing device upon detection of a trailer.

To rewind the photo film after exposures, an external slide button 50 is slid to a rewinding position. The slide button 50 is disposed toward the top in the rear of the camera. When the slide button 50 is slid to the rewinding position, its distal end 50b causes the charge claw member 42 to rotate clockwise beyond the charge position. The wind stop claw member 36 responsively rotates to the wind stop position a small amount, until being stopped in contact with another distal end 50a of the slide button 50. The wind stop claw member 36 retains the charge claw member 42 in the charge position. The wind stop claw 36a is away from the barrel portion 34. The sprocket wheel 26 and the set cam 32 are released. The motor 22 is rotated backwards, to pull the photo film 15 in the rewinding direction. To change the direction of rotation of the motor 22, a switch 70, shown in FIGS. 9 and 13, is changed over. The switch 70 is disposed to detect movement of the slide button 50 to a rewinding position. Note that the switch 70 is eliminated from FIG. 1 for the purpose of clarity.

The roller set 29, as illustrated in FIG. 2, is constituted by two rubber rollers 52 and 53, which are supported in rotatable fashion about a shaft 29a. A drum 54, having a reduced radius, is mounted between the rollers 52 and 53, and positioned create a space as high as the sprocket wheel 26. The drum 54 operates to prevent the rollers 52 and 53 from inadvertently abutting on the two teeth 25 inserted through the perforations 21. It is therefore possible to keep the rollers 52 and 53 in constant contact with the photo film 15 during the mesh of the perforations 21 with the two teeth 25, for contact between the photo film 15 and the peripheral face 27.

FIG. 3 is a plan view in which the photo film 15 is viewed from an emulsion surface. There is a single trailer detecting perforation 56 formed near to an edge of the photo film 15 opposite to the one having the perforations 21. The trailer detecting perforation 56 has a position between a final frame 55z and a trailer 15a. A leader 15b of the photo film 15 has an inclined edge 57 formed to reduce a width of the photo film 15.

Under the sprocket wheel 26, there is a detector claw 58 to be engaged with the trailer detecting perforation 56 in the photo film 15, for the purpose of detecting a trailer of the photo film. The detector claw 58 is swingable between an engaged position and a disengaged position with respect to the trailer detecting perforation 56. The detector claw 58 is biased by a spring 59 toward the engaged position. When the detector claw 58 is engaged with the trailer detecting perforation 56, the photo film is not advanced any farther.

Figure 4:
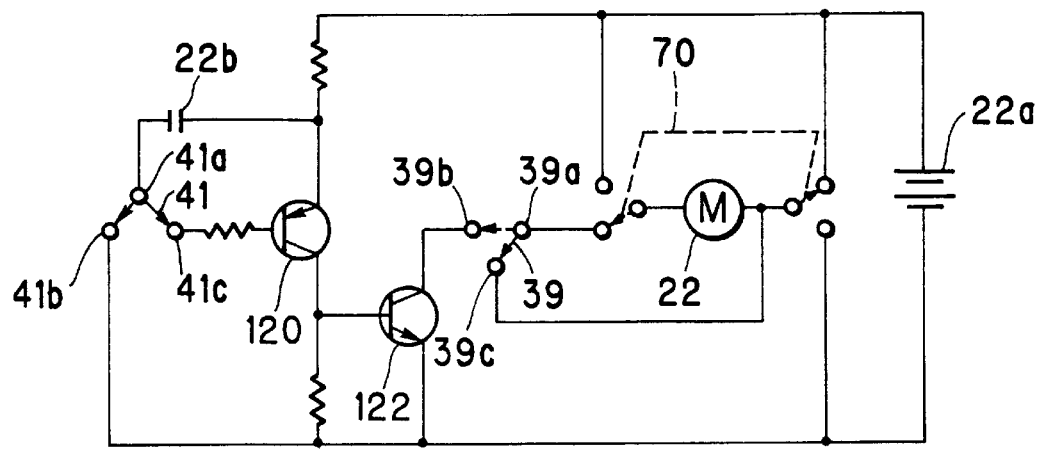
FIG. 4 is a block diagram illustrating a control circuit for driving a motor.
Figure 5:
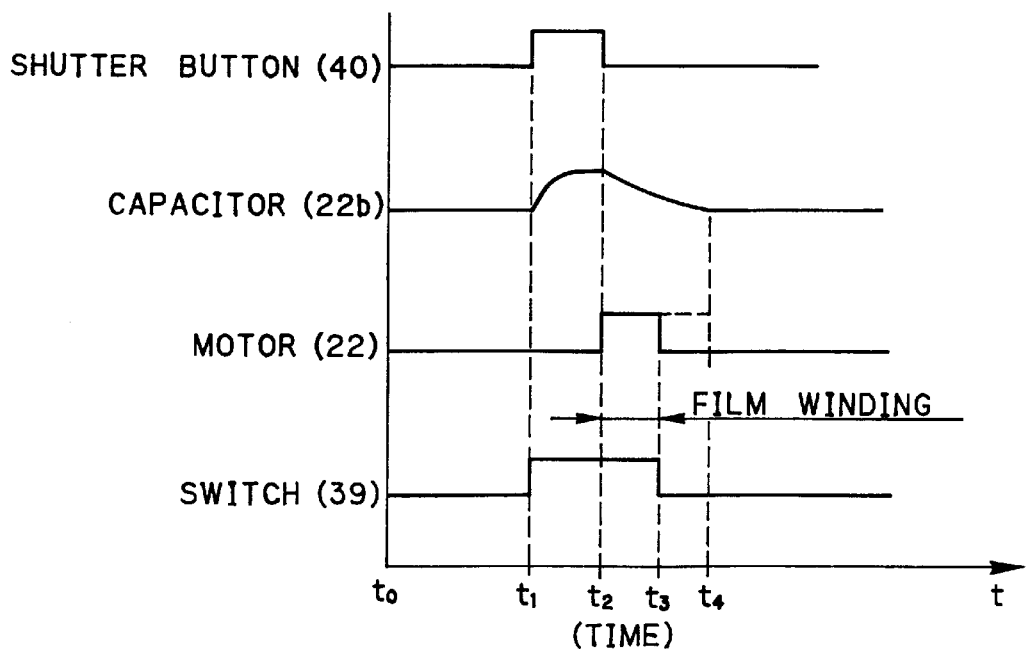
FIG. 5 is a timing chart illustrating operation of the control circuit.

FIG. 4 illustrates a control circuit for the motor 22. FIG. 5 is a timing chart illustrating operation of the control circuit. Before depression of the shutter release button 40 with the shutter charged, the switches 39 and 41 have the positions indicated by the solid lines in FIG. 5. A capacitor 22b is not charged yet after discharge. The terminals of the motor 22 are short-circuited without being driven. At the time t1, the shutter release button 40 is depressed. The switch 41 is turned on and changed over to a terminal 41b, so that the capacitor 22b is rapidly charged electrically by batteries 22a. Upon movement of the shutter release button 40 to a fully depressed position, the shutter operates to open/close. The wind stop claw member 36 rotates to the disengaged position, to turn on the switch 39 and change it over to a terminal 39b.

At the time t2, the shutter release button 40 is released. The switch 41 is turned off and changed over to a terminal 41c. The voltage across the capacitor 22b is applied to a base of a first transistor 120, to turn on the first transistor 120. Then a second transistor 122 is also turned on, to rotate the motor 22 in the forward direction. The voltage across the capacitor 22b is gradually discharged. Capacitance of the capacitor 22b and resistance of a resistor connected to the base of the first transistor 120 are predetermined at such values that the first transistor 120 is kept on during the duration from the time t2 to the time t4. This duration to be set previously by way of a timer is for example 12 seconds, which may be sufficiently longer than a duration required for a single frame advance of the photo film 15. It is safely possible within the timer duration to effect the one frame advance and the shutter charging. At the time t3, when the wind stop claw member 36 is swung to the charge position, the switch 39 is turned off and changed over to a terminal 39c. Then the terminal of the motor 22 is switched off, to stop driving the motor 22.

After a final exposure is taken, the detector claw 58 is engaged with the trailer detecting perforation 56 to hinder the photo film 15 from being wound. The wind stop claw member 36 has not rotated to the wind stop position. The switch 39 is still on without being turned off. The forward rotation of the motor 22 is automatically stopped at the time t4, when the voltage across the capacitor 22b becomes too low to keep the first transistor 120 on. Note that operation the switch 70 operates irrespective of the status of the switch 39 or 41, and is associated with a shift of the slide button 50.

The shape of the detector claw 58 engages such that it is the trailer detecting perforation 56 during forward travel of the photo film and moves away from the trailer detecting perforation 56 during the backward travel of the photo film. It is also designed to prevent the leader 15b from being captured on the detector claw 58 in the course of the initial advancement of the leader 15b.

Figure 6A:
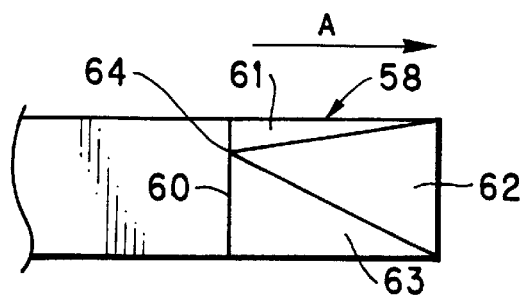
FIGS. 6A–6C are respectively a plan, a front elevation and a right-side elevation illustrating a trailer detecting claw.
Figure 6B:
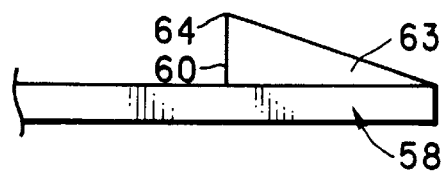
Figure 6C:
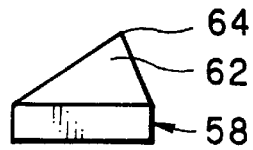
Figure 7:
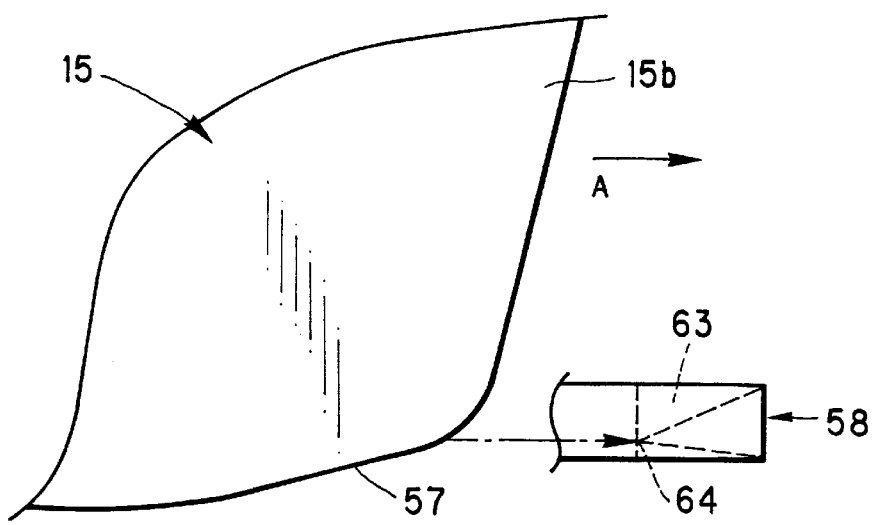
FIG. 7 is an explanatory view in front elevation, illustrating a state shortly before contact between a leader and the trailer detecting claw.
Figure 8:
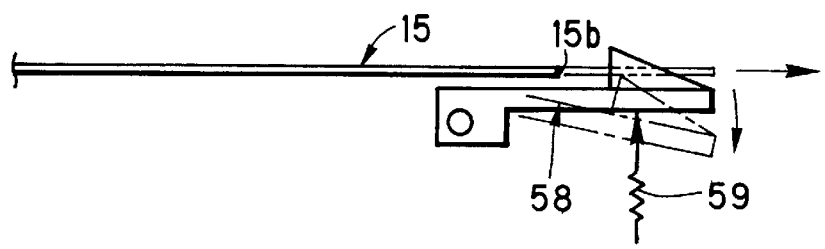
FIG. 8 is an explanatory view in plan, illustrating the same state as FIG. 7.

FIGS. 6A–6C illustrate a pyramidal shape of the detector claw 58, which includes an erect face 60 and three inclined faces 61–63. A top point 64 is located on a rear end of the detector claw 58 with reference to the advancing direction A, and is lower in a vertical direction. When the leader 15b is advanced, the inclined edge 57 of the leader 15b contacts the top point 64 as illustrated in FIGS. 7 and 8. The inclined edge 57 slides in contact with the inclined face 63 having a greater width. The detector claw 58 swings smoothly to the retracted position against the bias of the spring 59. As a result, the leader 15b is not accidentally stopped by the detector claw 58.

Operation of the above construction is now described. The bottom lid of the camera is opened. The photo film cassette 13 is inserted into the camera, before the bottom lid is closed. In response to the lid closing, the drive shaft 20 is rotated to open the port shutter. The charge claw member 42 stands retained in the charge position after the previous film rewinding operation, as is described later in detail.

The initial advancement of the photo film 15 is started by depression of the shutter release button 40. The switch 41 is turned on. The wind stop claw member 36 is rotated to the wind stop position to turn on the switch 39. The charge claw member 42 is rotated from the charge position to the initial position. Note that, if the slide button 50 remains in the rewinding position, a top face of the slide button 50 prevents the shutter release button 40 from being depressed. Then the shutter release button 40 is released from the depression, to turn off the switch 41. The voltage across the capacitor 22b turns on the first transistor 120, through which the motor 22 is caused to rotate forward.

While the motor 22 rotates forward, the leader 15b of the photo film 15 is advanced to the outside of the cassette shell 14. The leader 15b causes the detector claw 58 to swing to the disengaged position, advances to the take-up chamber, and is taken up by the take-up spool 23. The take-up spool 23 has been rotated forwards by the motor 22, and captures the leader 15b upon contact thereon. Speed of winding the photo film 15 about the take-up spool 23 is higher than speed of the advancement of the photo film 15 from the cassette shell 14. There is a slipping mechanism connected between the drive shaft 18 and the motor 22. After the leader 15b is taken up on the take-up spool 23, the take-up spool 23 is driven to advance the photo film.

When the photo film 15 starts being advanced, the sprocket wheel 26 also starts rotating. As illustrated in FIG. 3, no perforation like the perforations 21 is formed in the leader 15b. The first tooth 25a of the sprocket wheel 26 comes in contact with the photo film 15, before the sprocket wheel 26 is hindered from rotating. The photo film 15 is advances in contact with the peripheral face 27.

The photo film 15 is further advanced, until a first one of the perforations 21 comes to the position of the sprocket wheel 26. The first tooth 25a is engaged with the initial one of the perforations 21, and then disengaged therefrom. The second tooth 25b is engaged with a succeeding one of the perforations 21. Those ones of the perforations 21 in the photo film 15 apply high rotational force to the sprocket wheel 26. The charge claw member 42 in the initial position is rotated to the charge position by the charge cam portion 35. The wind stop claw member 36 is rotated to the wind stop position. The rotated wind stop claw member 36 turns off the switch 39 to stop the motor 22, to finish the initial advancement of the photo film 15.

An interval between a distal end of the leader 15b and the first one of the perforations 21 is greater than a length of one frame. Therefore the duration of the initial film advance is longer than the duration for a single frame advance. In consideration of this, the duration from t2 to t4 of the timer in FIG. 5 is for example 12 seconds, which may be sufficiently longer than the duration required for the initial advancement. If the initial advancement should not be finished in the duration from t2 to t4, the shutter release button 40 can be intentionally depressed. This depression can charge the capacitor 22b again, so that the voltage across the capacitor 22b can turn on the first transistor 120 to restart the motor 22.

At the finish of the initial advancement, an initial frame is set on the exposure aperture 11. As illustrated in FIG. 9, the charge claw member 42 is in the charge position. The wind stop claw member 36 is in the wind stop position. The second tooth 25b of the sprocket wheel 26 stands engaged with one of the perforations 21, the one located on a leader side of one frame. It is possible to keep the photo film 15 held in position even when the camera is seriously shocked or vibrated.

Figure 10:
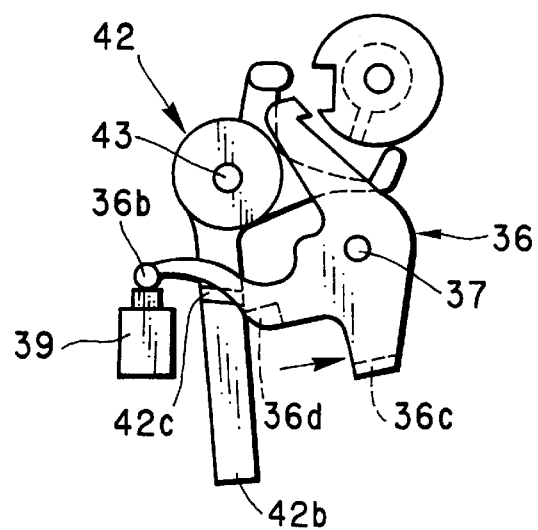
FIG. 10 is an explanatory view illustrating a state of the photo film advancing device upon depression of a shutter release button.
Figure 11:
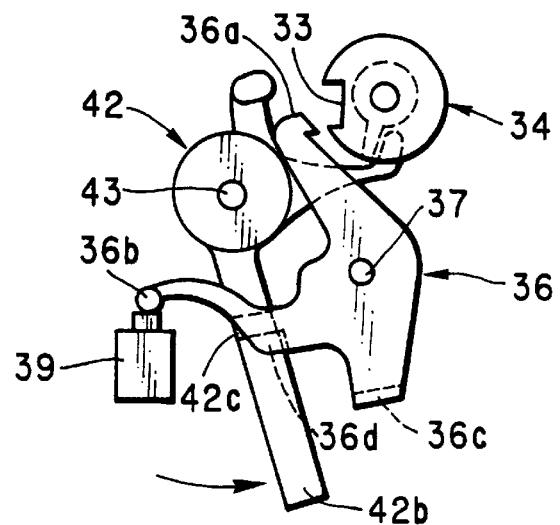
FIG. 11 is an explanatory view illustrating a state of the photo film advancing device upon rotation of a shutter charge claw member to an initial position.

When the shutter release button 40 is depressed, the rod 40a pushes the driven projection 36c. In FIG. 10, the wind stop claw member 36 is rotated counterclockwise about the shaft 37, to come to the disengaged position. The bottom ridge 36d is moved out of the rotational orbit of the top ridge 42c. As illustrated in FIG. 11, the bias of the coil spring 38 causes the charge claw member 42 instantaneously to swing about the shaft 43, to come to the initial position. The striking arm 42b strikes the shutter blade 44 to move the shutter blade 44 to the open position. Then the return spring 47 returns the shutter blade 44 to the closed position to finish taking an exposures.

The charge claw member 42 is rotated to the initial position, to move the top ridge 42c into the rotational orbit of the bottom ridge 36d. The wind stop claw member 36 is retained in the disengaged position. The wind stop claw 36a of the wind stop claw member 36 is moved out of the wind stop cam recess 33, to unlock the sprocket wheel 26. The driving projection 36b turns on the switch 39.

Figure 12:
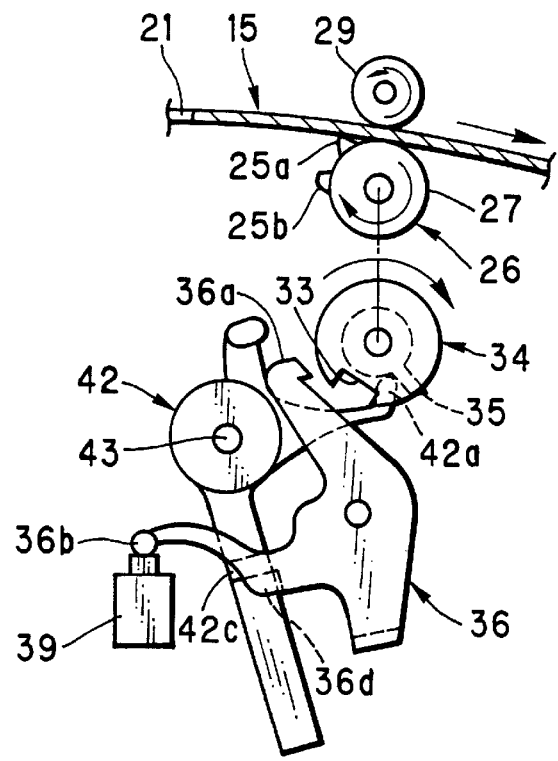
FIG. 12 is an explanatory view illustrating a state of the photo film advancing device during the one frame feeding.

While the shutter release button 40 is depressed, the capacitor 22b is charged. When the shutter release button 40 is released, the switch 41 is turned off, to start rotating the motor 22 forwards. The take-up spool 23 is rotated to advance the photo film 15. In a manner similar to the initial advancement, the sprocket wheel 26 is rotated by the advancement of the photo film 15. Further small rotation of the sprocket wheel 26 disengages the second tooth 25b from an associated one of the perforations 21. Then the sprocket wheel 26 is rotated by the frictional contact of the peripheral face 27 with the photo film 15 pressed by the roller set 29 as illustrated in FIG. 12. The side of the first tooth 25a relative to its thickness direction contacts the photo film 15 in a portion without the perforations 21. The sprocket wheel 26 does not rotate. The photo film 15 slides against the sprocket wheel 26 while being advanced.

While the photo film 15 slides against sprocket wheel 26, the sprocket wheel 26 remains stopped. The charge claw member 42 is not pushed by the charge cam portion 35. The top ridge 42c is still in the rotational orbit of the bottom ridge 36d. The wind stop claw member 36 is in the disengaged position. As illustrated in FIG. 9, the first tooth 25a meshes with a succeeding one of the perforations 21 to rotate the sprocket wheel 26. The first tooth 25a is then moved away from the perforations 21. The second tooth 25b meshes with another one of the perforations 21.

After the first tooth 25a comes in mesh with an associated one of the perforations 21, the sprocket wheel 26 rotates until meshes with the second tooth 25b and another one of the perforations 21. In the rotation, the charge cam portion 35 pushes up the charge claw 42a, to swing the charge claw member 42 to the charge position against the bias of the coil spring 38.

When the charge claw member 42 is in the charge position, the top ridge 42c is moved away from the rotational orbit of the bottom ridge 36d. The wind stop claw member 36 is rotated by the bias of the coil spring 38 toward the wind stop position. The sprocket wheel 26 has made slightly less than one rotation. The wind stop claw 36a contacts the barrel portion 34. The second tooth 25b is engaged with the succeeding one of the perforations 21, and rotates a small amount. The sprocket wheel 26 has made one rotation following the finish of the shutter release. The wind stop claw 36a comes into the wind stop cam recess 33, to lock the sprocket wheel 26. The wind stop claw member 36 comes to the wind stop position. The bottom ridge 36d moves into the rotational orbit of the top ridge 42c, to retain the charge claw member 42 in the charge position. The driving projection 36b turns off the switch 39, to stop the motor 22 from rotating forwards. Another frame on the photo film 15 is set on the exposure aperture 11.

Then the shutter release button 40 is depressed repeatedly in a manner the same as above, to sequentially take exposures. In the photo film winding after exposing the final frame 55z, the detector claw 58 is received in the trailer detecting perforation 56 to hinder the photo film 15 from advancing any farther. As soon as the voltage across the capacitor 22b comes down to a predetermined low level, the motor 22 is automatically stopped.

After the exposure is taken on the final frame 55z, the photo film 15 is wound. However only one of the perforations 21 is passed in the advancement. The first tooth 25a is engaged with the one of the perforations 21, before the second tooth 25b abuts on the photo film 15, which stops rotation of the sprocket wheel 26. The photo film 15 is wound while sliding against the peripheral face 27. Before automatic stop of the motor 22, the shutter is not charged irrespective of the use of the detector claw 58 and the trailer detecting perforation 56. No exposure is taken after the final frame 55z. The frame counter wheel 49 is not stepped any further. The present invention is also applicable to a camera without the detector claw 58.

After the final frame 55z is exposed and the motor 22 is stopped, the frame counter wheel 49 operates to indicate that all frames have been exposed. The user, having checked the indication, slides the slide button 50 in the direction B in FIG. 13 to rewind the photo film. With the slide button 50 in the rewinding position, the distal end 50a of the slide button 50 depresses the driving projection 36b to rotate the wind stop claw member 36 to the disengaged position. The distal end 50b depresses the receiving portion 42d to rotate the charge claw member 42 to the charge position to retain it. The charge claw 42a of the charge claw member 42 is moved away from the charge cam portion 35, to free the sprocket wheel 26. A front projection 50c of the slide button 50 turns on the switch 70.

Upon turning on the switch 70, the motor 22 is started rotating backwards. As described above, the sprocket wheel 26 is free. It is possible to travel the photo film 15 smoothly in the rewinding direction C. Note that the coil spring 38 is eliminated from FIGS. 10–13 for the purpose of clarity. The sprocket wheel 26 and the set cam 32 have a single common shaft, but are separately depicted in FIGS. 10–13 for a similar purpose.

During the rewinding, the sprocket wheel 26 is rotated in reverse. The sprocket wheel 26 is rotated by the friction between the peripheral face 27 and the photo film 15. While the second tooth 25b contacts the photo film 15, the photo film 15 slides the sprocket wheel 26 while advanced. The second tooth 25b and then the first tooth 25a come in mesh with two of the perforations 21, while the sprocket wheel 26 is rotated.

When all the photo film 15 as exposed is wound in the cassette shell 14, the frame counter wheel 49 is in its initial position representing a count "zero", because the sprocket wheel 26 has rotated in reverse at a rotational amount associated with exposed frames. A user is informed of a status of the finish of the rewinding the photo film 15 by the count "zero" on the frame counter wheel 49. The slide button 50 is slid back to the initial position, in reverse to the direction B in FIG. 13. Then the motor 22 is stopped.

When the slide button 50 is returned from the rewinding position to the initial position, the charge claw member 42 does not rotate to the initial position, as the charge claw member 42 is retained in the charge position by the wind stop claw member 36. The distal end 50a of the slide button 50 is moved away from the wind stop claw member 36, which rotates to the wind stop position. If the wind stop cam recess 33 in the barrel portion 34 is directly confronted with the wind stop claw 36a, the wind stop claw member 36 swings sufficiently to the wind stop position. If the wind stop cam recess 33 is deviated from the wind stop claw 36a, the wind stop claw member 36 swings toward the wind stop position until the wind stop claw 36a is contacted on the barrel portion 34. In either case, the charge claw member 42 remains retained by the wind stop claw member 36 in the charge position. Note that there may be an additional structure for automatically returning the slide button 50 to the initial position in response to the return of the frame counter wheel 49 to the initial position as start position.

The bottom lid is opened. In response, the drive shaft 20 is rotated, to rotate the port shutter to the closed position. The port shutter remains in the closed position after the cassette 13 is removed. The photo film 15 is not fogged by ambient light after being contained in the photo film cassette 13.

In the above embodiment, the roller set 29 including the spring 30 and the rollers 52 and 53 is used for pressing the photo film 15 against the sprocket wheel 26. Alternatively a plate spring or a resilient pad may used for pressing the photo film 15.

In the above embodiment, the two teeth 25a and 25b are formed on the sprocket wheel 26 for the purpose of lengthening a duration where the shutter is charged by advancement of the photo film 15 in the wheel driving step through the engagement of the two teeth 25a and 25b with the perforations 21 in the photo film 15. The present invention is applicable to a photo film advancing device with a sprocket wheel having only one tooth if a short duration is sufficient for charging the shutter.

In the above embodiment, the first tooth 25a stands disengaged from the perforations 21 with the second tooth 25b engaged with one of the perforations 21 when the one frame feeding of the photo film 15 is finished. However the present invention is applicable to a construction wherein both the two teeth 25a and 25b stand disengaged from the perforations 21 when the one frame feeding of the photo film 15 is finished.

The above construction, in which the second tooth 25b is engaged with one of the perforations 21 when the one frame feeding of the photo film 15 is finished, is still advantageous. This is because a frame is not deviated remarkably. With this construction, no error in the frame interval or positioning of each frame takes place, as no slip of the sprocket wheel 26 occurs relative to the photo film 15, at the start of the photo film advancement immediately after an exposure.

Figure 14:
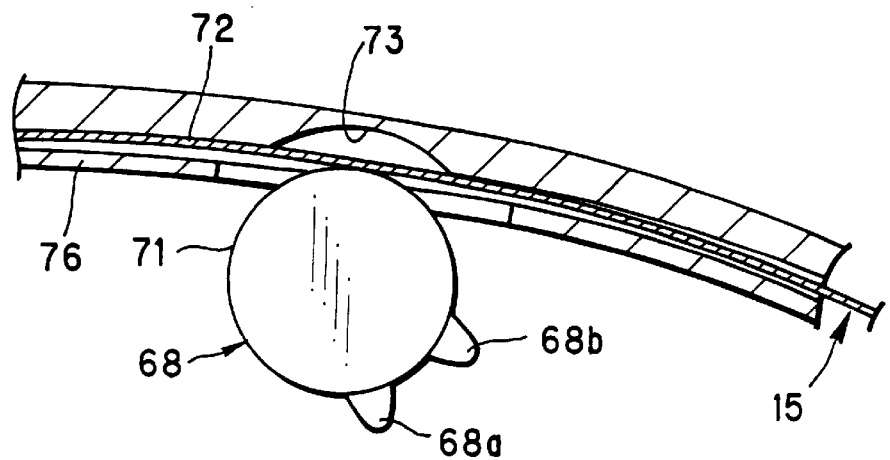
FIG. 14 is an explanatory view illustrating another preferred photo film advancing device.
Figure 15:
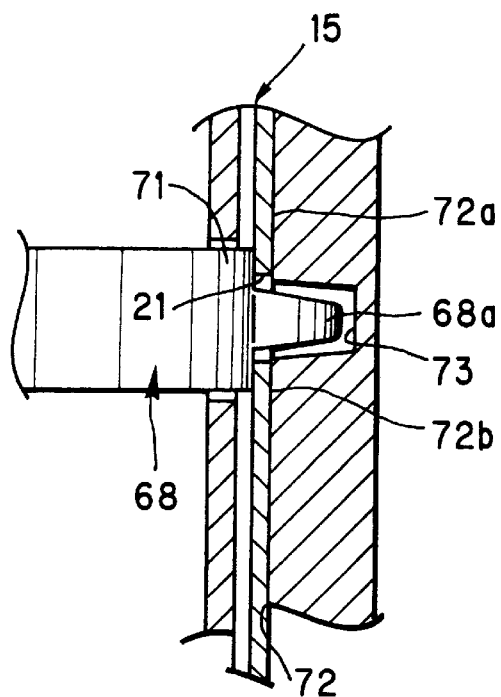
FIG. 15 is an explanatory view in elevation, illustrating a tooth of a sprocket wheel.

FIGS. 14 and 15 illustrates another preferred embodiment, in which a sprocket wheel 68 formed from resilient material is used instead of the rollers 52 and 53. The sprocket wheel 68 is so disposed that a circular peripheral face 71 is projected from out of a gear box 76 toward rear walls 72a and 72b against which the photo film 15 travels. The peripheral face 71, with friction, presses the photo film 15 in a passageway 72 toward the rear walls 72a and 72b, so that the sprocket wheel 68 is rotated by the advancement of the photo film 15. There is a recess 73 formed between the rear walls 72a and 72b in a position confronting with the sprocket wheel 68, for allowing the teeth 68a and 68b to rotate. The thickness of the peripheral face 71 is greater than a width of the perforations 21 in the vertical direction, so that the peripheral face 71 presses the photo film 15 against the rear walls 72a and 72b.

In the embodiments above, the sprocket wheel 26 makes one rotation during the one frame feeding of the photo film 15. The present invention is also applicable to a construction in which a sprocket wheel makes half a rotation while the photo film 15 is advanced as much as one frame. As illustrated in FIG. 16, two pairs of teeth are disposed on a circular peripheral face 80c of the sprocket wheel 80. Each of the two pairs of teeth includes first and second teeth 80a and 80b disposed away from one another in association with the regular interval L1 of each pair of the perforations 21. The pairs of teeth are located in positions 180 degrees away from each other. Portions of the peripheral face 80c between the pairs of the teeth 80a and 80b are adapted to slipping on the photo film 15. An arc length L3 of the portions of the peripheral face 80c is set smaller than the greater regular interval L2 between the pairs of the perforations 21 in the photo film 15 in FIG. 3.

The charge claw member 42 must be swung to the charge position while the two teeth 80a and 80b are engaged with a pair of the perforations 21 in half a rotation of the sprocket wheel 80. In view of this, it is necessary as a shutter charge mechanism to dispose two of the charge cam portion 35 about the set cam 32 in positions 180 degrees away from each other. The photo film must be stopped from being wound when the sprocket wheel 80 makes half a rotation. In view of this, it is necessary as a wind stop mechanism to form two wind stop cam recesses 33 in the barrel portion 34 in positions 180 degrees away from each other, for insertion of the wind stop claw 36a of the wind stop claw member 36.

FIGS. 17 and 18 illustrate a preferred embodiment in which a thin rubber ring 82 is fitted about the peripheral face 27 of the sprocket wheel 26 as friction member. There are holes 82a and 82b, formed in the rubber ring 82, for insertion of the two teeth 25a and 25b. This being so, the sprocket wheel 26 can be rotated without fail in frictional contact between the photo film 15 and the rubber ring 82 in rotational sections without engagement of the two teeth 25a and 25b with the perforations 21. The first tooth 25a of the sprocket wheel 26 comes in contact with the photo film 15, before the sprocket wheel 26 is hindered from rotating. The photo film 15 is advanced while sliding against the rubber ring 82.

Figure 19:
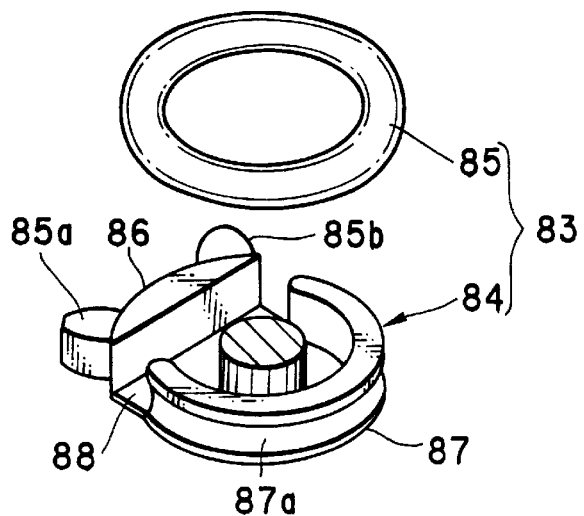
FIG. 19 is a perspective view illustrating a variant of sprocket wheel.
Figure 20:
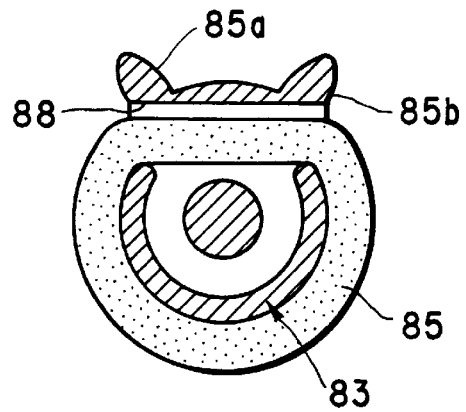
FIGS. 20 and 21 are respectively a horizontal section and a cross section, illustrating the sprocket wheel.
Figure 21:
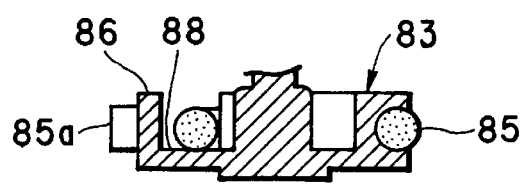

FIG. 19 illustrates another preferred sprocket wheel 83, including a wheel body 84 formed of plastic and a rubber ring 85, of which a section is circular, as friction member. The wheel body 84 includes a smaller portion 86 from which teeth 85a and 85b are projected, and a greater portion 87 having a circular peripheral face 87a with a recess. There is a slot 88 defined between the smaller portion 86 and the greater portion 87. The rubber ring 85 is fitted about the greater portion 87, namely on the peripheral face 87a and in the slot 88, to construct the sprocket wheel 83 as illustrated in FIGS. 20 and 21.

The sprocket wheel 26 can be rotated without fail in frictional contact between the photo film 15 and the rubber ring 85 in rotational sections without engagement of the two teeth 85a and 85b with the perforations 21. There is a space between the smaller portion 86 and the rubber ring 85 within the slot 88, with effectiveness in flexing the smaller portion 86 when the first tooth 85b is contacted on the photo film 15. The photo film 15 can be prevented from scratching in contact with the first tooth 85b. In the present embodiment, a position of fitting the rubber ring 85 is irrespective from those of the two teeth 85a and 85b. This is favorable over the embodiment depicted in FIG. 17, because of ease of assembly.

Figure 22:
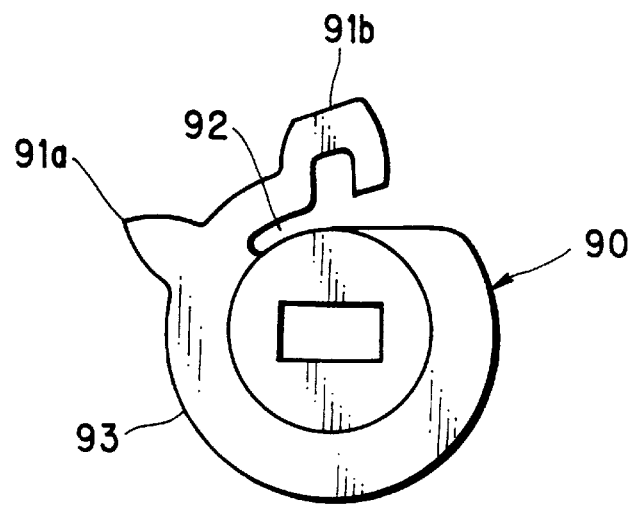
FIG. 22 is a plan view illustrating still another preferred sprocket wheel, in which a second tooth is greater than a first tooth.

In FIG. 22, a sprocket wheel 90 is formed with two teeth 91a and 91b from plastic. The sprocket wheel 90 is used with photo film 115 in FIG. 23, in which each pair of perforations includes a smaller perforation 21a and a greater perforation 21b. The smaller perforation 21a is equal to the perforations 21 of the above embodiments. Accordingly, the second tooth 91b is greater than the first tooth 91a. The photo film 115 is specialized in use for a lens-fitted photo film unit. After the lens-fitted photo film unit is used, the photo film 115 is unloaded. In the emptied lens-fitted photo film unit, it is possible to prevent it from being newly loaded with the photo film 15 with the perforations 21 of a single kind, because the second tooth 91b cannot be received in the perforations 21.

Figure 23:
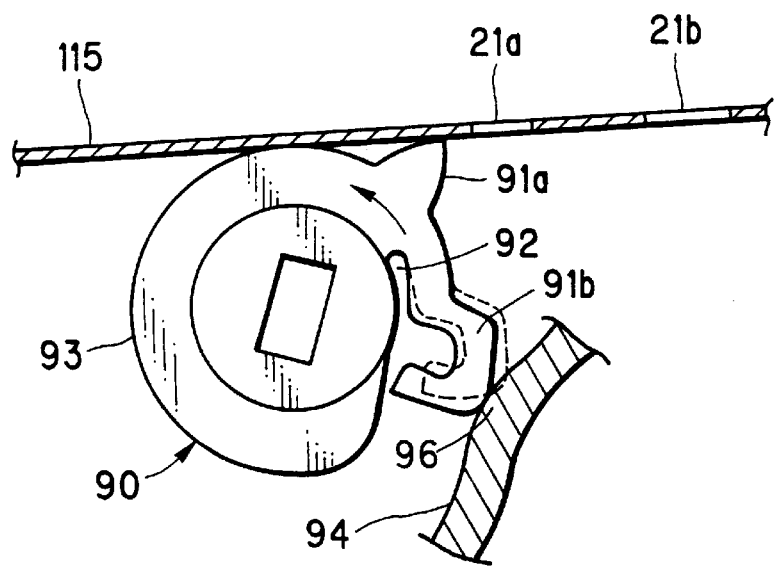
FIG. 23 is an explanatory view in plan, illustrating a photo film advancing device including the sprocket wheel of FIG. 22.

There is a cutout 92, formed in the sprocket wheel 90, to render the second tooth 91b flexible. In the frictional contact between the photo film 115 and a circular peripheral face 93, the sprocket wheel 90 is rotated. As illustrated in FIG. 23, the first tooth 91a of the sprocket wheel 90 comes in contact with the photo film 115, before the sprocket wheel 90 is hindered from rotating. The photo film 115 is advanced slidably along the peripheral face 93. The sprocket wheel 90 is contained in a gear box 94. A guide projection 96 inside the gear box 94 flexes the second tooth 91b from a position of the broken line to a position of the solid line. The recovering force of the second tooth 91b biases the sprocket wheel 90 in the counterclockwise direction. This makes it reliable to engage the first tooth 91a with the smaller perforation 21a coming nearer. Note that it is possible for the second tooth 91b to be the same size as the first tooth 91a. The construction of the present embodiment is applicable to a general purpose camera.

In the embodiments of FIGS. 1–21, the photo film is drawn out of the cassette frame by frame. Exposures are taken in the order from the leader to the trailer. The present invention is also applicable to a photo film advancing device in a camera or a lens-fitted photo film unit in which the photo film is entirely drawn out of the cassette in a previous step, and rewound into the cassette frame by frame, and exposures are taken in the order from the trailer to the leader. The embodiment of FIGS. 22 and 23 is a typical example of such a lens-fitted photo film unit.

Figure 24:
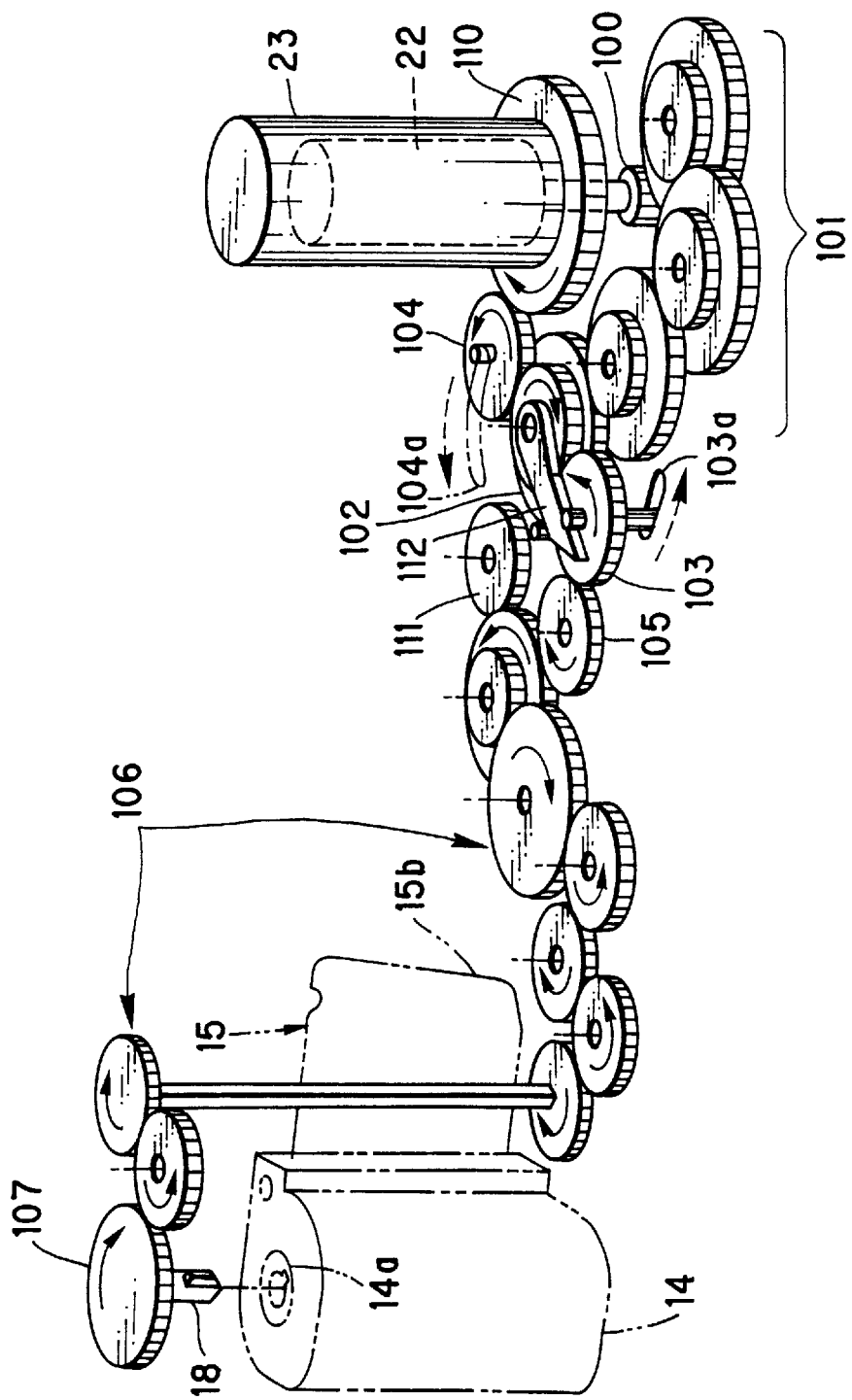
FIG. 24 is a perspective view illustrating a photo film winding mechanism.

FIG. 24 illustrates a preferred example of film winding mechanism driven by the motor 22. A gear train is depicted in relative enlargement. The motor 22 is driven by the circuit of FIG. 4. The present example includes a planetary gear structure associated between a drive system for a spool 14a of the cassette shell 14 and a drive system for the take-up spool 23, for changing over operation of the two drive systems.

The motor 22 is contained inside the take-up spool 23, which includes a rubber sheet wound thereabout. A drive gear 100 is directly connected to a drive shaft of the motor 22, and is meshed with a speed reducing gear train 101, which transmits rotation to a sun gear 102 constituting a planetary gear mechanism. The sun gear 102 is in mesh with two planet gears 103 and 104. When the sun gear 102 rotates in the clockwise direction indicated by the solid line, the planet gears 103 and 104 are revolved along respective guide slots 103a and 104a in planetary fashion.

When the planet gear 103 revolves in planetary fashion to the position as depicted, the planet gear 103 is engaged with a transmission gear 105. Rotation of the transmission gear 105 is transmitted to a spool gear 107 via a speed reducing gear train 106 constituting the spool drive system. The drive shaft 18 is formed on a bottom of the spool gear 107, and driven to rotate the spool 14a in the unwinding direction. When the planet gear 104 revolves in planetary fashion to the position as depicted, the planet gear 104 is engaged with a take-up gear 110 fixed on the take-up spool 23, which is rotated to wind the photo film 15 thereabout.

When the sun gear 102 rotates counterclockwise, the planet gears 103 and 104 revolve in the directions indicated by the broken lines. With the planet gear 103 revolved, the planet gear 103 is disengaged from the transmission gear 105. The planet gear 104 revolves in the direction of the broken line, to be in mesh with another transmission gear 111, which in turn causes the speed reducing gear train 106 to rotate in the direction opposite the solid lines. The spool 14a is rotated in the rewinding direction. A lever 112 is engaged with the sun gear 102 frictionally, and operates for auxiliary changing over of connection/disconnection between the planet gear 103 and the transmission gear 105 in response to the change of the sun gear 102 in rotational directions.

In operation, the initial advancement is started after loading of the photo film cassette 13. The motor 22 is rotated forwards. The sun gear 102 is rotated in the arrow direction of the solid line. The planet gear 103 comes in mesh with the transmission gear 105. The drive shaft 18 is caused via the speed reducing gear train 106 and the spool gear 107 to rotate in the unwinding direction. The planet gear 104 comes in mesh with the take-up gear 110 to drive it in the arrow direction of the solid line. The take-up spool 23 is driven in the direction for the photo film take-up.

The spool 14a is rotated by the drive shaft 18 in the unwinding direction. The photo film 15 is advanced to the outside of the cassette shell 14. The trailer 15a is passed through a photo film gate in the camera, and advanced toward the take-up spool 23. The trailer 15a is guided to the surface of the take-up spool 23 by contact of a photo film support roller (not shown) disposed near to the take-up spool 23 and known in the art. The take-up spool 23 has been started rotating by the planet gear 104 and the take-up gear 110, and takes up the trailer 15a upon coming thereto. When the photo film 15 is wound on the take-up spool 23 as much as one revolution, the photo film 15 is pulled out by rotation of the take-up spool 23.

The speed of the take-up spool 23 to wind the photo film 15 is set higher than the speed of the spool 14a to advance the photo film 15. When the take-up spool 23 while driven starts pulling the photo film 15, the speed of the spool 14a is raised by the pulling force of the photo film 15. The rotational speed of the transmission gear 105 becomes higher than the rotational speed of the planet gear 103 rotated by the sun gear 102. The planet gear 103 is revolved away from the transmission gear 105, in the arrow direction of the broken line about the sun gear 102 in mesh. Then the photo film 15 is advanced by rotation of the take-up spool 23, while the spool 14a is rotated by following the advancement of the photo film 15.

In the initial advancement, two of the perforations 21 for the first frame come to the sprocket wheel. As is described above, teeth of the sprocket wheel are engaged with perforations, and rotated. The shutter charging and the photo film stopping are effected to finish the initial advancement. Exposures are repeated. The one frame feeding of the photo film is effected in a similar manner.

After exposures are taken on the photo film 15, the slide button 50 is slid to the rewinding position. The motor 22 is started rotating backwards, to rewind the photo film 15. The motor 22 causes the sun gear 102 to rotate opposite the solid arrow, the planet gear 104 is revolved in the arrow direction of the broken line in planetary fashion about the sun gear 102, disengaged from the take-up gear 110 and engaged with the transmission gear 111. The take-up gear 110 becomes free as disconnected from the motor 22. The planet gear 103 still has the position away from the transmission gear 105. The speed reducing gear train 106 as spool drive system is rotated in reverse to the arrow direction of the solid line, to rotate the spool 14*a* in the rewinding direction. Then the photo film 15 after the exposures is wound by the spool 14*a* and drawn into the cassette shell 14. The take-up spool 23 is rotated by following the advancement of the photo film 15.

The finish of the rewinding is recognized by the user from changes in noise of driving and indication of the frame counter wheel 49. The slide button 50 is returned to the initial position to stop the motor 22. After this, a push-button associated with the bottom lid is operated for opening the same. In response, the drive shaft 20 is rotated, to rotate the port shutter in the photo film port 16 of the cassette shell 14 to the closed position for light-tight closing of the photo film port 16. The bottom lid is opened. The photo film cassette 13 with the photo film 15 fully wound after the exposures is removed from the camera.

Although the present invention has been fully described by way of the preferred embodiments thereof with reference to the accompanying drawings, various changes and modifications will be apparent to those having skill in this field. Therefore, unless such changes and modifications depart from the scope of the present invention, they should be construed as included therein.

What is claimed is:

1. A camera adapted to be used with photo film which is divided into a series of frames arranged at a regular pitch with perforations disposed along a first edge of the photo film, only a leading perforation and a trailing perforation of said perforations being associated with each said frame, each said leading and trailing perforation being associated, respectively, with a leading and trailing edge of each said frame, said leading perforation and said trailing perforation of adjacent said frames being disposed at a small regular interval from one another, said camera comprising:

a photo film winding mechanism adapted for winding said photo film in an advancing direction after each of said frames is exposed;

a rotatable sprocket wheel having a circular peripheral face whose circumference is shorter than said regular pitch, the rotatable sprocket wheel being arranged so that the peripheral face is adapted to be in contact with the photo film;

only two teeth disposed on the peripheral face of the sprocket wheel, the teeth being separated from one another by said small regular interval, a first of the teeth being adapted to engage with the trailing perforations of the photo film, a second of the teeth being adapted to engage with the leading perforations of the photo film;

a wind stop mechanism for setting the sprocket wheel in a locked state, the sprocket wheel being positioned while in the locked state so that at least one of the first and second teeth is positioned to be adapted to engage at least one of the leading and trailing perforations of the photo film, the wind stop mechanism setting the sprocket wheel in an unlocked state in which said sprocket wheel is allowed to rotate upon operation of a shutter;

wherein upon being set in said unlocked state, said sprocket wheel is adapted to be rotatable through frictional contact with the photo film during advancement of the photo film, moving the second tooth away from the leading perforation with which the second tooth was adapted to be engaged, the sprocket wheel being adapted to be further rotatable a predetermined amount while in said frictional contact until reaching a stand by position in which said first tooth is adapted to be in contact with said photo film, the sprocket wheel being adapted to remain in the stand by position until the first tooth is engagable with a next said trailing perforation of the photo film.

2. A camera as defined in claim 1, further comprising a pressing mechanism disposed adjacent to said sprocket wheel, wherein said pressing mechanism is capable of pressing said photo film against said peripheral face of said sprocket wheel while allowing said sprocket wheel to rotate.

3. A camera as defined in claim 2, wherein said pressing mechanism includes:

a pair of rollers disposed respectively higher and lower than a position where said perforations are able to pass, said rollers rotating about a common axis; and a spring for biasing said rollers to said photo film.

4. A camera as defined in claim 1, wherein at least said peripheral face of said sprocket wheel is formed of material having a high coefficient of friction.

5. A camera as defined in claim 4, wherein said sprocket wheel includes:

a wheel body having said peripheral face and said teeth; and a friction member, having said coefficient of friction higher than said wheel body, secured to said peripheral face, capable of being in frictional contact with said photo film, for rotating said wheel body in response to movement of said photo film.

6. A camera as defined in claim 5, wherein said friction member is shaped like a ring, has two holes, and is secured about said peripheral face of said wheel body with said first and second teeth fitted respectively in said holes.

7. A camera as defined in claim 5, wherein said friction member is shaped like a ring;

said wheel body further comprising a slot formed in and across said wheel body and behind said first and second teeth, said friction member being partially inserted in said slot, and secured about said peripheral face of said wheel body.

8. A camera as defined in claim 4, further comprising:

a gear box containing said sprocket wheel in rotatable fashion;

a rear wall disposed adjacent to said gear box, such that said photo film is capable of passing therebetween while in contact with said gear box; and an opening which is formed in said gear box, and through which said peripheral face of said sprocket wheel is projected toward said rear wall.

9. A camera as defined in claim 8, further comprising a recess formed in said rear wall, confronted with said sprocket wheel, wherein rotation of said sprocket wheel causes said teeth to pass through said recess.

10. A camera as defined in claim 1, further comprising:

a cutout, formed in said second tooth, for rendering said second tooth deformable with resiliency toward an inside of said sprocket wheel;

a gear box for containing said sprocket wheel in rotatable fashion, said gear box being disposed such that said photo film is capable of advancing in contact with said gear box; and a projection, projected from an inside of said gear box, confronted with said second tooth when said sprocket wheel is rotated said predetermined amount, pressed by said second tooth in a rotational orbit thereof while said first tooth stands by for said first perforation of said succeeding pair of perforations, capable of bringing said first tooth in contact with said photo film.

11. A camera as defined in claim 10, wherein said device is capable of operating with said photo film in which said first perforation has an area smaller than an area of said second perforation; and a mating area between said second tooth and said circular peripheral face is greater than a mating area between said first tooth and said circular peripheral face.

12. A camera as defined in claim 1, wherein said wind stop mechanism sets said sprocket wheel in said locked state under conditions that said first tooth is moved away from said first perforation and said second tooth is engaged with said second perforation.

13. A camera as defined in claim 12, further comprising a shutter charge mechanism displaceable between an initial position and a charge position, and when having said charge position, said shutter charge mechanism standing by for driving said shutter, said shutter charge mechanism being displaced to said charge position while said at least one pair of teeth makes one rotation from a position allowing engagement with said each pair of perforations to a position allowing engagement with said succeeding pair of perforations.

14. A camera as defined in claim 13, wherein said shutter charge mechanism is displaced to said charge position under a condition that said first tooth is rotated by said photo film from a position of engagement with said first perforation to a position of disengagement from said first perforation.

15. A camera as defined in claim 14, wherein said shutter charge mechanism is operated to release of said shutter while having said charge position, and drives said shutter when displaced back from said charge position to said initial position; and said wind stop mechanism is disposed near to said shutter charge mechanism and in displaceable fashion between a wind stop position and a disengaged position, and when said shutter charge mechanism is displaced to said charge position, said wind stop mechanism being displaced from said disengaged position to said wind stop position, to set said sprocket wheel in said locked state.

16. A camera as defined in claim 15, wherein said shutter charge mechanism includes:

a charge cam portion rotatable integrally with said sprocket wheel; and a charge claw member, disposed near to said charge cam portion in rotatable fashion, in contact with said charge cam portion when said sprocket wheel rotates, to rotate to said charge position, said charge claw member driving said shutter when rotated to said initial position.

17. A camera as defined in claim 16, wherein said wind stop mechanism includes:

a wind stop cam portion rotatable integrally with said sprocket wheel; and a wind stop claw member, disposed near to said charge cam portion in rotatable fashion between said wind stop position and said disengaged position, said wind stop claw member being rotated to said wind stop position in response to rotation of said charge claw member to said charge position, to retain said wind stop cam portion.

18. A camera as defined in claim 15, wherein said photo film winding mechanism includes:

a take-up spool, for taking up a leader of said photo film to wind said photo film;

a motor for rotating said take-up spool; and a control circuit for driving said motor immediately after said shutter is driven, and for stopping said motor when said wind stop mechanism sets said sprocket wheel in said locked state.

19. A camera as defined in claim 18, further comprising:

a shutter release button, displaced from an initial position to a depressed position when externally operated, for displacing said wind stop mechanism to said disengaged position, to displace said shutter charge mechanism back to said initial position abruptly, in order to operate said shutter;

said control circuit including:

a first switch, displaced to a first position in response to displacement of said shutter release button to said depressed position, and displaced to a second position in response to displacement of said shutter release button to said initial position, said second position being adapted to rotation of said motor;

a second switch, connected to said motor, turned on in response to displacement of said wind stop mechanism to said disengaged position, and turned off in response to displacement of said wind stop mechanism to said wind stop position, said motor being stopped when said second switch is turned off.

20. A camera as defined in claim 19, wherein said control circuit includes:

a battery for supplying said motor with electric power;

a first transistor connected to said battery in series therewith;

a capacitor, charged when said first switch is in said first position, and discharged when said first switch is in said second position, for turning on said first transistor while voltage across said capacitor comes down to a predetermined level; and a second transistor, connected to said motor and said second switch in series therewith, and turned on when said first transistor and said second switch are both turned on, for rotating said motor.

21. A photo film advancing device comprising:

a photo film winding mechanism adapted for use with a photo film;

a rotatable sprocket wheel having a circular peripheral face;

only two teeth disposed on the peripheral face such that the two teeth are not diametrically opposed to one another;

a wind stop mechanism for setting said sprocket wheel in a non-rotatable locked state while in a first position for an exposure in which at least one of the teeth is adapted to be engaged with a said photo film, the wind stop mechanism being adapted to set the sprocket wheel in a rotatable unlocked state after completion of the exposure;

wherein the sprocket wheel, while in the unlocked state, is adapted to be rotated as a consequence of movement of the photo film winding mechanism until the sprocket wheel stops at a stand-by position, the sprocket wheel reaching the stand-by position prior to reaching the first position for a subsequent exposure, the sprocket wheel rotating into the first position for the subsequent exposure and into the locked state.

22. A photo film advancing device comprising:
- a photo film winding mechanism adapted for use with a photo film;
- a rotatable sprocket wheel having a circular peripheral face;
- only four teeth disposed on the peripheral face in two pairs, the teeth in each of the pairs being separated from one another by less than 90°;
- a wind stop mechanism for setting said sprocket wheel in a non-rotatable locked state while in a first position for an exposure in which at least one of the teeth is adapted to be engaged with a said photo film, the wind stop mechanism being adapted to set the sprocket wheel in a rotatable unlocked state after completion of the exposure;
- wherein the sprocket wheel, while in the unlocked state, is adapted to be rotated as a consequence of movement of the photo film winding mechanism until the sprocket wheel stops at a stand-by position, the sprocket wheel reaching the stand-by position prior to reaching the first position for a subsequent exposure, the sprocket wheel rotating into the first position for the subsequent exposure and into the locked state.

23. A camera adapted to be used with photo film which is divided into a series of frames arranged at a regular pitch with perforations disposed along a first edge of the photo film, only a leading perforation and a trailing perforation of said perforations being associated with each said frame, each said leading and trailing perforation being associated, respectively, with a leading and trailing edge of each said frame, said leading perforation and said trailing perforation of adjacent said frames being disposed at a small regular interval from one another, said camera comprising:
- a photo film winding mechanism for winding said photo film in an advancing direction after each of said frames is exposed;
- a rotatable sprocket wheel having a circular peripheral face whose circumference is shorter than twice said regular pitch, the rotatable sprocket wheel being arranged so that the peripheral face is adapted to be in contact with the photo film;
- only two pairs of teeth disposed on the peripheral face of the sprocket wheel, the teeth of each said pair being separated from one another by said small regular interval, each of the pairs of teeth including a first tooth and a second tooth adapted to engage with the trailing perforations and the leading perforations, respectively, of the photo film, a distance between immediately adjacent said teeth being greater in one peripheral direction than in an opposite peripheral direction;
- a wind stop mechanism for setting the sprocket wheel in a locked state, the sprocket wheel being positioned while in the locked state so that at least one of the first and second teeth is positioned to be adapted to engage with at least one of the leading and trailing perforations of the photo film, the wind stop mechanism setting the sprocket wheel in an unlocked state in which said sprocket wheel is allowed to rotate upon operation of a shutter;
- wherein upon being set in said unlocked state, said sprocket wheel is adapted to be rotatable through frictional contact with the photo film during advancement of the photo film, moving the second tooth currently adapted to be engaged with one of the leading perforations of the photo film away from the perforation, the sprocket wheel being adapted to be further rotatable a predetermined amount while in said frictional contact until reaching a stand by position in which one of said first teeth is adapted to be in contact with said photo film, the sprocket wheel being adapted to remain in the stand by position until the first tooth adapted to be in contact with the photo film is positioned to be engagable a next said trailing perforation of the photo film.

24. A camera as defined in claim 23, further comprising a shutter charge mechanism displaceable between an initial position and a charge position, and when being in said charge position, said shutter charge mechanism standing by for driving said shutter, said shutter charge mechanism being displaced to said charge position while said sprocket wheel makes said half rotation from a position in which said first pair of teeth is positioned for engagement with said pair of perforations, to a position where said second pair of teeth is positioned for engagement with said succeeding pair of perforations; and
- a shutter release button, depressed when externally operated, for displacing said wind stop mechanism to set said sprocket wheel in said unlocked state, to displace said shutter charge mechanism back to said initial position abruptly, in order to operate said shutter.

* * * * *